US012732695B2

(12) United States Patent
Xu et al.

(10) Patent No.: US 12,732,695 B2
(45) Date of Patent: Sep. 8, 2026

(54) IMAGING METHOD AND SYSTEM AND STORAGE MEDIUM

(71) Applicant: GeneMind Biosciences Co., Ltd., Shenzhen (CN)

(72) Inventors: Jianfeng Xu, Shenzhen (CN); Huan Jin, Shenzhen (CN); Yang Li, Shenzhen (CN); Xiaoqiang Fang, Shenzhen (CN)

(73) Assignee: GeneMind Biosciences Co., Ltd., Shenzhen (CN)

( * ) Notice: Subject to any disclaimer, the term of this patent is extended or adjusted under 35 U.S.C. 154(b) by 0 days.

(21) Appl. No.: 18/917,262

(22) Filed: Oct. 16, 2024

(65) Prior Publication Data

US 2025/0193517 A1 Jun. 12, 2025

(30) Foreign Application Priority Data

Dec. 6, 2023 (CN) ......................... 202311686579.7

(51) Int. Cl.
*H04N 23/67* (2023.01)
*G03B 13/36* (2021.01)

(52) U.S. Cl.
CPC ............. *H04N 23/67* (2023.01); *G03B 13/36* (2013.01)

(58) Field of Classification Search
CPC ...... H04N 23/67; G03B 13/36; G02B 21/244; C12Q 1/6874; G01N 21/01; G01N 21/84
See application file for complete search history.

(56) References Cited

U.S. PATENT DOCUMENTS 6,215,588 B1 * 4/2001 Wachi ................ G02B 21/0004 359/368
2006/0039064 A1 * 2/2006 Kawahito .............. G02B 7/285 359/368
2022/0050281 A1 * 2/2022 Hofmann ............... G02B 21/02

FOREIGN PATENT DOCUMENTS

CN 112333378 A 2/2021

OTHER PUBLICATIONS

Extended European Search Report mailed in EP Application No. EP24218014, on May 7, 2025, 8 pages.

* cited by examiner

*Primary Examiner* — Nhan T Tran
(74) *Attorney, Agent, or Firm* — Kagan Binder, PLLC

(57) ABSTRACT

The present disclosure provides an imaging method using an imaging system to image an object, wherein the object is positioned in a preset region, the imaging system comprises an objective lens and an automatic focusing assembly coupled with the objective lens, and the automatic focusing assembly is configured for detecting position information of the object positioned in the preset region and outputting a target electric signal of the object when the imaging system acquires a clear image of the object. The imaging method comprises: moving, according to the detected position information of the object of interest in the preset region and the output target electric signal of the object of interest by the automatic focusing assembly, the objective lens and/or the preset region to a position where the clear image of the object of interest can be acquired, so as to acquire the clear image of the object of interest using the imaging system. According to the target electric signals of objects, automatic focus tracking can be achieved for different objects in the preset region, and clear images can be acquired. The present (Continued)

disclosure further provides an imaging system and a storage medium.

17 Claims, 2 Drawing Sheets

IMAGING METHOD AND SYSTEM AND STORAGE MEDIUM

TECHNICAL FIELD

The present disclosure relates to the field of optical detection technology, and in particular, to an imaging method and system and a storage medium.

BACKGROUND

In the related art, for example, in the microscopic detection of biological samples, biological macromolecules, etc., especially in a scenario where a microscopic imaging system using a high-power, high-precision lens (e.g., an objective lens) acquires or continuously acquires images of a plurality of objects to detect specific information of the objects based on the analysis of the images, it is necessary to ensure a certain degree of definition of the images.

For example, in a sequencing platform for nucleic acid sequence determination based on microscopic imaging detection, when an imaging system is used for imaging a nucleic acid sample in practical application, external interference is inevitable, leading to failures in focusing of the imaging system and thus in acquiring clear images. For example, when the imaging system operates, bubbles in the liquid inside the chip, large fluorescent impurities, or dust, scratches and the like on the surface of the chip may readily fail the focusing of the imaging system. For another example, when the imaging system is used for imaging, the vibration of the imaging system may be caused by external factors, which may also easily cause a failure in focusing of the imaging system. In such a case, if the imaging system cannot refocus, the obtained image may be blurred, and the basecall may be inaccurate.

Therefore, it is desirable that the sequencing platform is able to perform automatic focus tracking during the sequencing. For example, when interference is caused by vibration due to external factors, the sequencing platform can adjust the position to eliminate the interference. However, in sequence determination practice, although the imaging system may normally focus and the images acquired by the imaging system are clear when the automatic focus tracking starts, the images acquired by the imaging system may become blurred as the chip moves relative to the imaging system, leading to failures in focus tracking after the position adjustment in the sequencing platform and failures in the acquisition of clear images. Thus new technical schemes are still required.

SUMMARY

The present disclosure is intended to resolve at least some of the above problems, including the failure in acquiring clear images of all or part of objects during the process of acquiring clear images of a series of objects when an imaging system comprising an automatic focusing assembly performs focus tracking on the objects.

According to a first aspect, provided is an imaging method using an imaging system to image an object, wherein the object is positioned in a preset region, the imaging system comprises an objective lens and an automatic focusing assembly coupled with the objective lens, and the automatic focusing assembly is configured for detecting position information of the object positioned in the preset region and outputting a target electric signal of the object when the imaging system acquires a clear image of the object; the imaging method comprises:

moving, according to the detected position information of the object of interest in the preset region and the output target electric signal of the object of interest by the automatic focusing assembly, the objective lens and/or the preset region to a position where the clear image of the object of interest can be acquired, so as to acquire the clear image of the object of interest using the imaging system.

According to a second aspect, provided is an imaging system, comprising:

- an imaging optical path assembly, comprising an objective lens and an imaging detection component, wherein the imaging detection component is configured for imaging an object positioned in a preset region;
- an automatic focusing assembly, configured for emitting a first light beam to the preset region, receiving the first light beam reflected from the preset region for focusing detection, acquiring position information of the object, and outputting a target electric signal of the object when the imaging detection component acquires a clear image of the object;
- a driving assembly, configured for driving the objective lens and/or the preset region to move; and a controller, configured for:
- controlling, according to the detected position information of the object of interest in the preset region by the automatic focusing assembly and the target electric signal of the object of interest, the driving assembly to move the objective lens and/or the preset region to a position where the clear image of the object of interest can be acquired, so as to acquire the clear image of the object of interest using the imaging detection component.

According to a third aspect, provided is a computer-readable storage medium having a program stored thereon, the program being executable by a processor to implement the method according to the first aspect.

According to the imaging method of the embodiments, automatic focus tracking can be achieved for different objects in the preset region according to the target electric signals of objects, and thus clear images can be acquired.

DETAILED DESCRIPTION

Figure 1:
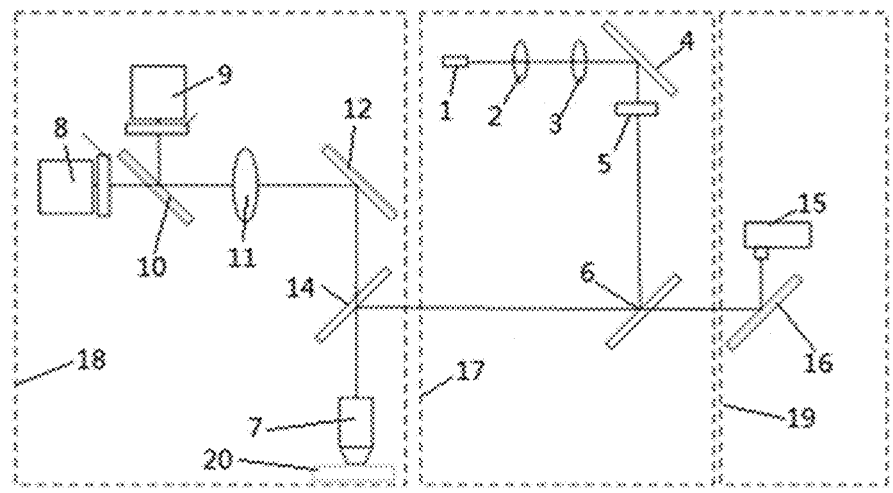
FIG. 1 is a structural schematic of an imaging system according to one example.

The present disclosure will be illustrated in further detail with reference to the following detailed description and drawings. Like elements in different examples have been given like numerals associated therewith. In the following embodiments, numerous specific details are given to provide a thorough understanding of the present application. However, those skilled in the art will readily recognize that some of the features may be omitted or substituted with other elements, materials, and methods in different instances. In some instances, certain operations related to the present application are not illustrated or described in this specification to avoid obscuring the key part of the present application with unnecessary detail. For those skilled in the art, it is not necessary to describe in detail these related operations, as such operations can be fully understood from the description in the specification and the general knowledge in the art.

Furthermore, the illustrated features, operations, or characteristics in the specification may be combined in any suitable manner to give various embodiments. Also, the various procedures or actions in the description of the methods may be exchanged or adjusted in order, as will be apparent to those skilled in the art. Thus, the various orders in the specification and drawings are for the purpose of clearly illustrating certain embodiments only and are not intended to imply a necessary order unless otherwise indicated that a certain order is necessary.

The serial numbers used herein for the components, such as "first", "second", etc., are used merely to distinguish between the objects described, and do not carry any sequential or technical meaning.

The terms "connect" and "couple" as used herein include both direct and indirect connections (couplings), unless otherwise specified.

Currently, in the process of sequencing platform using an optical imaging system to image a sample of interest on a chip for base sequence determination (hereinafter referred to as "sequencing"), in order to give clear images, the imaging system needs to perform focusing, for example, by moving the chip and/or the objective lens of the imaging system, such that the chip is positioned on a focal plane of the objective lens. After the focusing succeeds, the relative distance between the objective lens and the chip when the imaging system acquires a clear image is recorded and is retained in subsequent procedures, which may be referred to as a focus lock. When the relative position of the objective lens and the chip is changed due to external vibration or other factors, the interference of the vibration is eliminated by adjusting the relative distance for bringing the objective lens and the chip back to the locked focus, which may be referred to as focus tracking. The focus tracking may conducted manually or automatically by the imaging system, and the latter is referred to as automatic focus tracking.

At present, in the automatic focus tracking process of a sequencing platform, the focusing is generally performed at the initial position of a chip. After the focusing succeeds, the focus is locked, and during the process that a moving mechanism of the sequencing platform drives the chip to move, the relative distance between the objective lens of the imaging system and the chip is retained due to the focus lock. When the imaging system is used for imaging the sample of interest on the chip, if the flatness of the chip surface meets the requirement, the imaging system can keep focusing and acquire clear images when the moving mechanism of the sequencing platform drives the chip to move. However, in practice, fixing or heating the chip may cause deformation in the chip, and the flatness of the chip surface changes after the chip deforms. The objective lenses of imaging systems are usually high-power objective lenses with a relatively small depth of field. If the relative distance between the objective lens and the chip changes significantly, for the significant change, the imaging system, even with normal focus tracking functionality, may fail in focus tracking and thus in acquiring clear images.

In some examples of the present disclosure, when the imaging system images a plurality of objects in the preset region of the chip, the objects are imaging/photographing regions when the imaging system images a sample of interest in the preset region. In other words, the object is a region corresponding to a field of view when the imaging system images a sample of interest in a preset region, e.g., a FOV region. Before the imaging system starts the automatic focus tracking in the preset region, the imaging system does not only perform focusing at an initial position of the preset region, but performs focusing on at least two designated objects in a target channel of the preset region and acquires a target electric signal of each designated object when the focusing succeeds. The target electric signals may be focus tracking voltages, i.e., the focus tracking voltages of the designated objects, which are voltages output by an automatic focusing assembly when a clear image at the designated object is acquired by the imaging system. The clear image may refer to an image with a definition that allows the recognition of information in the image by an operator or a device. For example, when the sharpness value of the image reaches a threshold sharpness value, the image may be considered as a clear image; for another example, a corresponding score may be obtained by evaluating a spot in the image, and when the score reaches a threshold score, the image may be considered as a clear image. According to the focus tracking voltages of the objects, automatic focus tracking can be achieved for each object in the preset region, thus giving a clear image.

Figure 2:
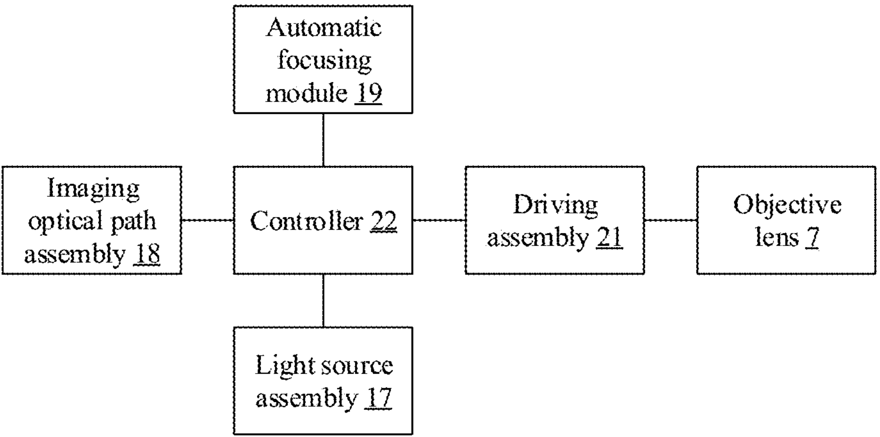
FIG. 2 is a structural schematic of an imaging system according to another example.

Some examples provide an imaging system configured for imaging a sample of interest containing a plurality of objects in a preset region of a chip. The imaging system can perform automatic focus tracking during the imaging process, thus keeping the images clear to achieve gene sequencing on the sample of interest. Referring to FIGS. 1 and 2, the imaging system comprises a stage 20, a light source assembly 17, an imaging optical path assembly 18, an automatic focusing assembly 19, a driving assembly 21, and a controller 22, which will be described in detail below.

Figure 3:
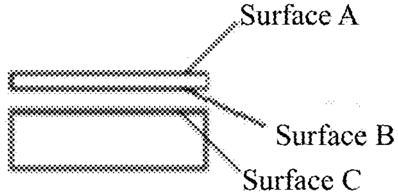
FIG. 3 is a structural schematic of a chip according to one example.

The stage 20 is configured for carrying a chip. The chip may be a gene sequencing chip, for carrying a sample of interest, e.g., DNA fragments, RNA fragments, and other biomolecules. Referring to FIG. 3, in some examples, the preset region of the chip comprises a plurality of surfaces axially movable relative to the optical axis of the objective lens. For example, when the chip comprises an upper glass plate and a lower glass plate, and a channel (fluid channel) defined by the upper glass plate and the lower glass plate, the plurality of axially movable surfaces includes an upper surface (surface A) of the upper glass plate, a lower surface (surface B) of the upper glass plate, and an upper surface (surface C) of the lower glass plate. At least one of the plurality of axially movable surfaces is loaded with a sample of interest, and the surface loaded with the sample of interest is the target surface for imaging. For example, surface B is specially chemically modified, and the surface is connected with an oligonucleotide sequence via a hydrogen bond, and the oligonucleotide sequence can be complementarily hybridized with an adapter sequence of a single-stranded DNA or RNA. That is, the sample of interest is positioned on surface B. Therefore, surface B is the target surface that will eventually undergo the optical focusing and image focusing as described below. In some examples, the sample of interest may also be positioned on surface C, and thus surface C is the target surface that will eventually undergo the optical focusing and image focusing as described below. In some examples, the sample of interest may be positioned on surfaces B and C, and thus surfaces B and C are target surfaces that will eventually undergo the optical focusing and image focusing as described below.

In some examples, the preset region of the chip comprises at least one channel. Each channel may comprise a plurality of objects. The objects in the same channel are arranged in the same direction, for example, in a latitudinal direction or in a longitudinal direction. Thus, after imaging an object in a channel, the imaging system needs to transfer to another object in the channel until all objects in the channel are imaged.

Referring to FIG. 1, the automatic focusing assembly 19 comprises a first light source and a focusing sensor 15. The first light source is configured for providing a first light beam, e.g., infrared light at 850 nm. The objective lens 7 is configured for projecting the first light beam to the preset region of the chip and acquiring the first light beam reflected from the surface of the preset region of the chip. The focusing sensor 15 receives the first light beam reflected from the surface of the preset region of the chip acquired by the objective lens 7 to give first light beam information. In some examples, the focusing sensor 15 comprises a CCD array therein. As such, the shape and size of the spot of the first light beam can be detected by the CCD array, and whether the preset region of the chip is positioned on the focal plane of the objective lens is determined according to the shape and size of the spot, thereby achieving focusing detection. In some examples, the focusing sensor 15 and the first light source are at different positions, e.g., different positions on the same horizontal plane. The preset region of the chip, the focusing sensor 15, and the first light source form a triangle. Thus, according to the principle of triangulation, when the relative distance (usually the distance in the perpendicular direction) between the preset region of the chip and the focusing sensor 15 is constant, the first light beam reflected from the surface of the preset region of the chip will image at a fixed position on the CCD array, and when the relative distance between the preset region of the chip and the focusing sensor 15 is changed, the position imaged on the CCD array will also change. As such, the relative distance between the preset region of the chip and the focusing sensor 15 can be acquired on the basis of the change in the imaging position on the CCD array. In some examples, the CCD array can perform photoelectric conversion on the received first light beam and then output a corresponding voltage. As such, a reference voltage of a reference position on the CCD array may be set, so that the voltage output by the photoelectric conversion of the CCD array corresponds to a relative distance between the preset region of the chip and the focusing sensor 15. That is, when the relative distance between the preset region of the chip and the focusing sensor 15 is constant, the voltage output by the photoelectric conversion of the CCD array is also constant. In some examples, the first light source may be a built-in light source of the focusing sensor 15. In some examples, the automatic focusing assembly 19 further comprises a third mirror 16.

Referring to FIG. 1, the light source assembly 17 comprises a second light source 1, a collimating lens 2, a converging lens 3, a first mirror 4, a first filter 5, and a first dichroic mirror 6. The light source assembly 17 is configured for providing a second light beam. The second light beam is a dual-wavelength excitation light, e.g., excitation light at 640 nm and 532 nm. When the second light beam irradiates the sample of interest in the preset region of the chip, the second light beam is configured for exciting different fluorophores labeling different bases in the sample of interest to generate fluorescence.

Referring to FIG. 1, the imaging optical path assembly 18 comprises the objective lens 7 and the imaging detection component. The objective lens 7 is configured for, when the second light beam emitted by the second light source 1 passes through the objective lens 7, projecting the second light beam to the sample of interest and acquiring the fluorescence generated by the sample of interest. The imaging detection component is configured for imaging the fluorescence acquired by the objective lens 7 so as to acquire images of the sample of interest. In some examples, the imaging detection component comprises a first camera 8 and a second camera 9. The imaging optical path assembly 18 further comprises a second dichroic mirror 10, a tube lens 11, a second mirror 12, and a third dichroic mirror 14. A second filter is disposed between the first camera 8 and the second dichroic mirror 10, and a third filter is disposed between the second camera 9 and the second dichroic mirror 10. Specifically, the second light beam emitted by the second light source 1 sequentially passes through the collimating lens 2, the converging lens 3, the second mirror 4, the first filter 5 and the first dichroic mirror 6, and is reflected by the third dichroic mirror 14 to the objective lens 7 and projected to the sample of interest by the objective lens 7 to excite different fluorophores on the sample of interest to emit fluorescence. The fluorescence is received by the objective lens 7 before sequentially passing through the third dichroic mirror 14, the second mirror 12 and the tube lens 11, and is then divided into a third light beam and a fourth light beam by the second dichroic mirror 10. The third light beam is transmitted by the second dichroic mirror 10 and is received by the first camera 8 after passing through the second filter, and the fourth light beam is reflected by the second dichroic mirror 10 and is received by the second camera 9 after passing through the third filter. The third light beam comprises a fluorescent signal at a first wavelength, e.g., a signal representing base A; the fourth light beam comprises a fluorescent signal at a second wavelength, e.g., a signal representing base T. Referring to FIG. 1, in some examples, after being emitted by the second light source 1, the second light beam sequentially passes through the collimating lens 2 (for collimating and expanding the beam) and the converging lens 3, is reflected by the first mirror 4, transmitted by the first filter 5 and sequentially reflected by the first dichroic mirror 6 (for reflecting laser beams at 640 nm and 532 nm) and the third dichroic mirror 14 (for reflecting laser beams at 640 nm and 532 nm), and finally passes through the objective lens 7 to irradiate the preset region of the chip and excite the sample of interest to generate fluorescence. The fluorescence acquired by the objective lens 7 is transmitted by the third dichroic mirror 14 (for transmitting the fluorescence), then reflected by the second mirror 12 to the tube lens 11, and converged and emitted by the tube lens 11 to the second dichroic mirror 10. The second dichroic mirror 10 receives the light beam from the tube lens 11 and divides the light beam into a third light beam and a fourth light beam. The third light beam is transmitted by the second dichroic mirror 10 and is received by the first camera 8 after passing through the second filter, and the fourth light beam is reflected by the second dichroic mirror 10 and is received by the second camera 9 after passing through the third filter.

Referring to FIG. 1, in some examples, after being emitted from the first light source, the first light beam is reflected by the third mirror 16, transmitted by the first dichroic mirror 6 (for transmitting infrared light at 850 nm) and reflected by the third dichroic mirror 14, and finally passes through the objective lens 7 to irradiate the preset region of the chip. The first light beam reflected from the preset region of the chip is acquired by the objective lens 7, reflected by the third dichroic mirror 14, transmitted by the first dichroic mirror 6, and finally reflected by the third mirror 16 to the focusing sensor 15.

The driving assembly 21 is configured for driving the objective lens 7 to move. In some examples, the driving assembly 21 is configured for driving the objective lens 7 to move along the optical axis thereof, or the driving assembly 21 is configured for driving the objective lens 7 to move in a direction perpendicular or parallel to the optical axis thereof, so as to adjust the distance between the objective lens 7 and the preset region of the chip and position the target surface (e.g., surface B) of the preset region of the chip on the focal plane of the objective lens 7, thus completing the optical focusing or image focusing in the preset region of the chip. In some examples, the driving assembly 21 may drive the objective lens 7 to move by a servo motor, a step motor, or the like, and may also drive the objective lens 7 to move by a linear module, a lead screw, or the like. In some examples, the driving assembly 21 may further be configured for driving the stage to move, such that the preset region of the chip can move in a direction perpendicular or parallel to the optical axis.

In some examples, when the driving assembly 21 drives the objective lens 7 to move and position the target surface (e.g., surface B) of the preset region of the chip on the focal plane of the objective lens 7, the focusing is completed. In some examples, whether the surface of the preset region of the chip is positioned on the focal plane of the objective lens 7 can be determined according to the first light beam information (focus detection result) acquired by the focusing sensor. For example, when the surface of the preset region of the chip is positioned on the focal plane of the objective lens 7, the amount of light that is reflected by the surface of the preset region of the chip is the greatest, and thus the light intensity value of the first light beam reflected by the surface of the preset region of the chip detected by the focusing sensor is also the greatest. In some examples, the cross-section of the first light beam provided by the first light source is semicircular, and the first light beam converges to a circular spot on the focal plane after passing through the objective lens 7. When the surface of the preset region of the chip is positioned on the focal plane of the objective lens 7, the spot formed on the CCD array of the focusing sensor by the first light beam reflected from the surface of the preset region of the chip is also a circular spot. When the surface of the preset region of the chip is positioned above the focal plane of the objective lens 7, the spot formed on the CCD array of the focusing sensor by the first light beam reflected from the surface of the preset region of the chip is the right half of a circle. When the surface of the preset region of the chip is positioned below the focal plane of the objective lens 7, the spot of the CCD array of the focusing sensor by the first light beam reflected from the surface of the preset region of the chip is the left half of a circle. As such, whether the surface of the preset region of the chip is positioned on the focal plane of the objective lens 7, or whether the focusing succeeds, can be determined by the detected light intensity value and spot information of the first light beam reflected from the surface of the preset region of the chip. That is, the first light beam information comprises the light intensity value and/or spot information of the first light beam.

The process of determining whether the focusing succeeds through the focusing detection of the focusing sensor may be referred to as optical focusing.

In some examples, whether the target surface (e.g., surface B) of the preset region of the chip is positioned on the focal plane of the objective lens 7 may also be determined according to the definition of the image acquired by the imaging detection component. For example, when the target surface of the preset region of the chip is located on the focal plane of the objective lens 7, i.e., the best position for the objective lens 7 to acquire fluorescence, the image definition of the sample of interest after being imaged by the imaging detection component is also the best. When the target surface of the preset region of the chip is positioned above or below the focal plane of the objective lens 7, the image definition of the sample of interest imaged by the imaging detection component is lower than the best definition. As such, whether the target surface of the preset region of the chip is positioned on the focal plane of the objective lens 7, or whether the focusing succeeds, can be determined by determining the definition of the image. The process of determining whether the focusing succeeds through the image acquired by the imaging detection component may be referred to as image focusing.

In some examples, since the fluorescence generated by the sample of interest is finally imaged by the imaging detection component, so as to determine the base sequence of the sample of interest, a successful image focusing is required. In some examples, the definition of the image acquired by the imaging detection component imaging the sample of interest on the target surface after image focusing is greater than the definition of the image acquired by the imaging detection component imaging the sample of interest on the target surface after optical focusing. Therefore, the optical focusing is required first. The target surface (e.g., surface B) of the preset region of the chip is found according to the detection results of the focusing sensor 15, and the position of the objective lens 7 corresponding to the target surface is acquired when the optical focusing succeeds. The optical focusing can be regarded as coarse focusing. That is, the position of the objective lens corresponding to the target surface acquired on the basis of optical focusing is not the best position for optical imaging yet and cannot be directly used for final optical exposure and image acquisition. In addition, according to the position of the objective lens 7 corresponding to the target surface acquired by optical focusing, a position of the objective lens 7 corresponding to the best image definition acquired by the imaging detection component imaging the target surface is further sought by fine focusing on the target surface via image focusing and used for final optical exposure and image acquisition. In this example, the optical focusing in the preset region of the chip is implemented by the objective lens to find the target surface of the preset region of the chip, and the image focusing is implemented on the target surface, such that the objective lens 7 can accurately focus on the target surface, thus improving the definition of the images.

The principle of the imaging system for automatic focus tracking compensation is described in detail below.

The controller 22 selects a target channel from at least one channel of the preset region of the chip and selects at least two designated objects from the target channel.

When the chip is moved in a specific direction, e.g., in a direction perpendicular to the optical axis of the objective lens, the imaging system sequentially focuses on each object in the same channel in the preset region of the chip, and when the system focuses on other channels, the position of the chip will be adjusted, which may cause discontinuity in focusing between different channels. Therefore, a target channel is first selected from the at least one channel in the preset region of the chip for focusing, which may be manual or conducted by the controller 22. Then, at least two designated objects are selected from the target channel, which may also be manual or conducted by the controller 22.

For each designated object, the controller 22 controls the imaging optical path assembly 18, the automatic focusing assembly 19 and the driving assembly 21 to focus on the sample of interest in the designated object, and acquires a voltage generated by photoelectric conversion of the focusing sensor when the focusing succeeds as the focus tracking voltage of the designated object. The following is a detailed description of the focusing process for one of the designated objects.

In some examples, the controller 22 first controls the driving assembly 21 to drive the objective lens to move along the optical axis thereof, controls the automatic focusing assembly 19 to perform optical focusing on the sample of interest in the designated object, and acquires the position of the objective lens 7 when the optical focusing succeeds as the optical focusing position. In some examples, on the basis of the current position of the objective lens 7, the controller 22 controls the driving assembly 21 to drive the objective lens 7 to move within a first range at a first step. In this example, the current position of the objective lens 7 may be an approximate position adjusted manually, and then optical focusing may be performed on the basis of the current position of the objective lens 7. The current position of the objective lens 7 may also be the focus position of the previous chip, and then optical focusing is performed on the basis of the current position of the objective lens 7 after the previous chip is replaced by the current chip. In this example, when the preset region of the chip has one surface, the surface is the target surface of interest, and when the preset region of the chip has a plurality of surfaces, the target surface should be sought from the plurality of surfaces. In some examples, on the basis of the current position of the objective lens, the driving module is controlled to drive the objective lens to move along the optical axis thereof within the first range at the first step.

When the current position of the objective lens 7 is at coordinate Z=Z1 in the direction of the optical axis, then the first range may be (Z1+X, Z1−X), and the controller 22 controls the driving assembly 21 to drive the objective lens 7 to scan from coordinate Z1−X to coordinate Z1+X in the direction of the optical axis at the first step. In some examples, X is 175 μm and the first step is 2.0 μm, such that the surface of the preset region of the chip can be sought in a broad range. After every move of the objective lens 7, the controller 22 controls the focusing sensor 15 to detect the first light beam reflected from the surface of the preset region of the chip, and acquires the first position of the objective lens 7. After the objective lens 7 completes the scan within the first range, the controller 22 determines whether the surface of the preset region of the chip is detected according to the detection results. In some examples, the relative distance between the focal plane of the objective lens 7 and the surface of the preset region of the chip in each detection may be acquired according to the light intensity value and the spot information of the first light beam reflected from the surface of the preset region of the chip in each detection. For example, when the light intensity value has a maximum value and the spot is a circular spot, the relative distance between the focal plane of the objective lens 7 and the surface of the preset region of the chip may be determined as zero or substantially zero (within a tolerated error range). As such, each time the relative distance acquired in one detection is zero, it may be determined that the surface of the preset region of the chip is detected in this detection. If at least one surface is detected and the target surface is present among the detected surfaces, the optical focusing succeeds. The first position of the objective lens 7 when the target surface is detected is acquired and used as the optical focusing position, or otherwise, the optical focusing fails.

In some examples, when two or more surfaces are detected by optical focusing, the target surface needs to be found from the detected surfaces, and the controller 22 is configured for acquiring the positions of the objective lens 7 when the surfaces of each preset region of the chip are detected and acquiring the distance between the surfaces of the preset region of the chip according to the distances between the positions of the objective lens 7. Finally, the positions of the surfaces in the preset region of the chip are determined according to the distances between the surfaces of the preset region of the chip, and the target surface is determined from two or more surfaces according to the positions of the surfaces in the preset region of the chip. In this example, the distances between the surfaces of the preset region of the chip can be approximately acquired from the distances between the positions of the objective lens 7, and the distances between the surfaces of the preset region of each chip are determined. As such, the positions of the surfaces in the preset region of the chip can be determined according to the distances between the surfaces of the preset region of the chip, and finally, the target surface is determined according to the positions of a plurality of surfaces in the preset region of the chip. In some examples, the surfaces of the preset region of the chip are the upper surface (surface A) of the upper glass plate, the lower surface (surface B) of the upper glass plate, and the upper surface (surface C) of the lower glass plate. The thickness is 175 μm for the upper glass plate, 75 μm for the channel, and 500 μm for the lower glass plate. Thus surfaces A, B, and C can be determined according to the distance between the surfaces of the preset region of the chip, and the target surface, e.g., surface B, can be selected. In some examples, after acquiring the distances between the positions of the objective lens, it is necessary to take into account that the distance is the thickness of the glass medium based on the air medium. Therefore the distance should be converted as per the refractive index. That is, the distances between the positions of the objective lens are multiplied by the refractive index of the glass, so as to give the distances between the surfaces of the preset region of the chip.

In some examples, the image focusing comprises a first image focusing and a second image focusing. On the basis of the optical focusing position, the objective lens 7 is driven to move along the optical axis thereof at a second step using the driving assembly 21, and after every move, a second position of the objective lens 7 is acquired and the object on the target surface is imaged using the imaging detection component to give a first image. The second position of the objective lens 7 corresponding to the first image with the best image definition is used as a first image focusing position of the objective lens 7 for the target surface.

Specifically, after the optical focusing position of the objective lens 7 is acquired, the controller 22 controls the driving assembly 21 to drive the objective lens 7 to move, controls the imaging optical path assembly 18 to perform the first image focusing on the sample of interest in the designated object, and acquires the second position of the objective lens 7 when the image focusing succeeds as a first image focusing position of the objective lens 7 for the target surface. In some examples, on the basis of the optical focusing position of the objective lens 7, the controller 22 controls the driving assembly 21 to drive the objective lens 7 to move within a second range at a second step. For example, when the optical focusing position of the objective lens 7 is at coordinate Z=Z2 in the direction of the optical axis of the objective lens, then the second range may be (Z2+Y, Z2−Y), and the controller 22 controls the driving assembly 21 to drive the objective lens 7 to stepwise scan from coordinate Z2−Y to coordinate Z2+Y in the direction of the optical axis at the second step. In some examples, the second step is smaller than the first step to improve the accuracy. In some examples, Y is 5 μm, and the second step is 1.0 μm. As can be seen from the second range and the second step, the accuracy of image focusing is higher than that of optical focusing, such that the surface of the preset region of the chip can be sought in a smaller range. After every move of the objective lens 7, the controller 22 controls the imaging detection component to perform image acquisition on the sample of interest to give a first image, acquires a second position of the objective lens 7, and acquires a first image with the best definition among the first images. If the definition of the first image with the best definition is superior to a threshold definition, the image focusing succeeds and a second position of the objective lens 7 corresponding to the first image with the best definition is acquired as the first image focusing position of the objective lens 7 for the target surface. In this example, the definition of the image may be acquired by evaluating the image. For example, the sharpness value of the image may be calculated and used as the definition of the image. For example, the spots in the images may be evaluated to give corresponding scores, and the scores are used as the definition of the images. The score of the spots in each image is calculated by the following formula:

$$\text{Score} = ((k1 \times k2 - 1)CV - EV)/((CV + EV)/(k1 \times k2));$$

The matrix corresponding to the spot is defined as a matrix k1×k2 composed of odd rows and odd columns, which contains k1×k2 pixels. CV denotes the central pixel value of the matrix corresponding to the spot, and EV denotes the sum of the non-central pixel values of the matrix corresponding to the spot. It will be appreciated that the image definition can be acquired by evaluating the image in other ways. In some examples, after the position of the objective lens for acquiring the first image with the best definition is acquired, it is indicated that the position of the objective lens is closest to the best focusing distance in the second range. As such, when the definition of the first image with the best definition is superior to the threshold definition, the image focusing is deemed successful, and the image focusing position of the objective lens is thus acquired. The threshold definition may be an image definition required by the image to satisfy the gene sequencing.

In some examples, when the driving assembly 21 is controlled to drive the objective lens 7 to move within the second range at the second step, the controller 22 is further configured for determining whether the definition of the first image acquired by the imaging detection component is superior to the preset definition after every move of the objective lens 7. If the definition is smaller than the preset definition, the second step is retained, and the driving assembly 21 is controlled to drive the objective lens to continue moving. If the definition is greater than the preset definition, the second step is reduced, and the driving assembly 21 is controlled to drive the objective lens to continue moving. In this example, when the definition of the acquired first image is superior to the preset definition, it indicates that the position of the objective lens is closer to the best focusing distance. Thus, in order to acquire a more accurate position of the objective lens, the second step should be reduced, or otherwise, the second step is retained to continue approaching the best focusing distance. For example, in the case of the second range (Z2+Y, Z2−Y), Y is 5 μm and the second step is 1.0 μm.

When the definition of the acquired first image is superior to the preset definition, the second step is reduced to 0.3 μm, or otherwise, maintained at 1.0 μm.

In some examples, on the basis of the first image focusing position, the objective lens 7 is driven to move along the optical axis thereof at a third step using the driving assembly 21, and after every move, a third position of the objective lens 7 is acquired and the object on the target surface is imaged using the imaging detection component to give a second image. The third position of the objective lens 7 corresponding to the second image with the best image definition is used as a second image focusing position of the objective lens 7 for the target surface. Specifically, after the first image focusing position of the objective lens 7 for the target surface is acquired, the controller 22 controls the driving assembly 21 to drive the objective lens 7 to move, controls the imaging optical path assembly 18 to perform the second image focusing on the sample of interest in the designated object, and acquires a voltage generated by photoelectric conversion of the focusing sensor 15 on the basis of the received first light beam reflected from the target surface when the second image focusing succeeds as the focus tracking voltage of the designated object. In this example, since the first image focusing process is based on the optical focusing position of the objective lens 7, and the objective lens 7 is moved within the second range at the second step, the first image focusing position of the objective lens 7 for the target surface is acquired. At this time, the focusing sensor 15 performs photoelectric conversion on the received first light beam reflected from the surface of the preset region of the chip, and outputs a voltage generated by the photoelectric conversion as the focus tracking voltage of the designated object. In some examples, one end of a sample of interest having a certain length (e.g., a single-stranded nucleic acid molecule) is fixed on the target surface, and the other end of the sample of interest is spaced apart from the target surface to which the sample of interest is fixed by a certain distance (e.g., ten to hundred nanometers), such that when the target surface of the chip is positioned on the focal plane of the objective lens 7, the sample of interest is not actually positioned on the focal plane of the objective lens 7. If, at this time, the voltage generated by photoelectric conversion of the focusing sensor 15 on the basis of the received first light beam reflected from the target surface is used as the focus tracking voltage, a certain degree of deviation may be present, and a longer length of the sample of interest may lead to a greater deviation. To reduce the deviation, the controller 22 controls the reset of the voltage output by the focusing sensor 15 to the driving assembly 21, for example, by performing a make 0 operation to prompt the focusing sensor 15 that it is not the best timing to acquire a clear image of the sample of interest when the target surface is positioned on the focal plane of the objective lens 7 or when the spot formed on the CCD array of the focusing sensor 15 by the first light beam reflected from the target surface is also a circular spot. At this time, the second image focusing is required to give clear images of the sample of interest. Specifically, the objective lens is moved within a third range at the third step on the basis of the first image focusing position of the objective lens 7. In some examples, the second step is equal to the third step. After every move of the objective lens, the imaging detection component is controlled to perform image acquisition on the sample of interest, to give the second image, and to acquire a second image with the best definition among the second images. If the definition of the second image with the best definition is superior to a threshold definition, the second image focusing succeeds. In some examples, the process of the second image focusing is substantially identical to the process of the first image focusing. For example, when the first image focusing position of the objective lens 7 is at coordinate Z=Z3 in the direction of the optical axis thereof, then the third range may be (Z3+Y, Z3−Y), and the controller 22 controls the driving assembly 21 to drive the objective lens 7 to stepwise scan from coordinate Z3−Y to coordinate Z3+Y in the direction of the optical axis at the third step, wherein Y is 5 μm, and the third step is 0.3 μm. In this example, during the second image focusing, the automatic focusing assembly 19 also operates. That is, after each move of the objective lens 7, the automatic focusing assembly 19 also performs photoelectric conversion on the received first light beam reflected from the target surface and generates a corresponding voltage. Since the first light beam reflected by the target surface is substantially maintained stable when the target surface of the preset region of the chip is substantially positioned on the focal plane of the objective lens 7, the relative distance between the target surface and the objective lens 7 is also stable at this time, such that the voltage generated by the photoelectric conversion is also maintained stable. Thus the change in the distance between the focal plane of the objective lens 7 and the target surface of the preset region of the chip can be determined by the change in the voltage. When the second image focusing succeeds, the voltage generated by the photoelectric conversion of the focusing sensor 15 performed on the received first light beam reflected from the target surface when the second image with the best definition is acquired is acquired as the focus tracking voltage, so as to ensure the effectiveness and accuracy of the subsequent focus tracking processes.

In some examples, if the optical focusing above fails, the image focusing comprises a third image focusing. That is, the controller 22 controls the imaging optical path assembly 18 and the driving assembly 21 to perform the third image focusing on the sample of interest in the designated object, and acquires the position of the objective lens 7 when the third image focusing succeeds as the optical focusing position. In some examples, the process of the third image focusing is substantially identical to the process of the first image focusing, but differs in that the moving range and the moving step of the objective lens 7 are different. That is, the moving range and the moving step of the objective lens 7 during the third image focusing are both greater than those during the first image focusing. In some examples, the controller 22 is configured for controlling the driving assembly 21 to drive the objective lens 7 to move within a fourth range at a fourth step at the current position of the objective lens 7. In some examples, the moving range and the moving step of the objective lens 7 during the third image focusing are identical to those of the optical focusing. That is, the fourth range is equal to the first range, and may also be (Z1+X, Z1−X), where X is also 175 μm and the fourth step is also 2.0 μm, such that the surface of the preset region of the chip can be sought in a broad range. After every move of the objective lens 7, the controller 22 controls the imaging detection component to perform image acquisition on the sample of interest, to give the third image, and to determine whether the surface of the preset region of the chip is detected according to the changes in definition of the third images. When the surface of the preset region of the chip is positioned on the focal plane of objective lens 7, the definition of the image acquired by the imaging detection component is greater than those of the images acquired when the surface of the preset region of the chip is positioned above or below the focal plane of objective lens 7. Therefore, the surface of the preset region of the chip can be found according to the changes in the definitions of the third images. In some examples, when whether the surface of the preset region of the chip is detected is determined according to the changes in the definitions of the third images, the controller 22 is configured for sequentially acquiring the definitions of the third images according to a moving sequence of the objective lens 7. When the definition of one of the third images is superior to the definitions of two adjacent third images, it is indicated that the definition of the image is increased and then decreased, and it can be determined that the surface of the preset region of the chip is detected when the third image is acquired. If at least one surface of the preset region of the chip is detected and the target surface is present among the at least one surface of the preset region of the chip, the third image focusing succeeds, and the position of the objective lens 7 when the target surface is detected is acquired as the optical focusing position. In this example, when optical focusing fails due to reasons of the device or the sample, for example, a position deviation is present in the optical device (the automatic focusing assembly 19), and for another example, temperature variation is present in the sample, the focusing detection results of the automatic focusing assembly 19 cannot detect a surface of the preset region of the chip. At this time, in order to avoid the focusing failure, the third image focusing may be performed by the imaging detection component to find out the target surface among the surfaces of the preset region of the chip, so as to remedy the optical focusing when the automatic focusing assembly 19 fails to focus.

As can be seen from the above description, when focusing on a designated object succeeds, the focus tracking voltage is acquired and can be used to indicate a relative distance between the target surface of the preset region of the chip and the objective lens 7 in the designated object. As such, when the relative distance between the target surface and the objective lens is changed, a difference is generated between the voltage generated by the photoelectric conversion of the focusing sensor 15 performed on the received first light beam reflected from the target surface and the focus tracking voltage, resulting in a focusing failure. Thus the focus tracking voltage can be used for automatic focus tracking in the designated object. However, due to the deformation in the preset region of the chip, when focusing on the object in the same channel, the relative distances between the target surfaces and the objective lens 7 are different, and the acquired focus tracking voltages are also different. Therefore, when the automatic focus tracking is performed on the objects based on a fixed focus tracking voltage, the focus tracking may fail, giving a blurred image.

In this regard, the controller 22 may acquire a preset relationship between each object in the target channel and the focus tracking voltage thereof according to the focus tracking voltages of at least two designated objects in the target channel and the positions of the designated objects.

In some examples, since the chip requires fixation before the nucleic acid fragment sequencing, the preset region of the chip may be deformed, and thus the deformation in the preset region of the chip may not be completely random but may be, for example, a linear deformation due to the fixation of the preset region of the chip where, e.g., relative to a horizontal plane, one end of the preset region of the chip is higher while the other end of the preset region of the chip is lower, or a curved deformation due to the fixation of the preset region of the chip where, e.g., the middle of the preset region of the chip is lower while the two ends of the preset region of the chip are higher. In general, the deformation caused by the fixation of the preset region of the chip is regular, and similarly, the deformation caused by other factors may also be regular. Therefore, on the basis of the principle of the deformation in the preset region of the chip, through the height distribution at the positions of at least two designated objects, the height distribution at the positions of the other objects can be acquired. In this example, since the height distribution at the positions of the designated objects corresponds to the focus tracking voltages thereof, the preset relationship between the objects in the target channel and the focus tracking voltages thereof can be acquired from the focus tracking voltages of at least two designated objects.

In some examples, a fitting relationship between the position information of the designated object and the focus tracking voltage of the designated object is acquired according to the focus tracking voltages of at least two designated objects and the position information thereof in the target channel, and used as the preset relationship. Then the focus tracking voltages of the other objects are acquired according to the preset relationship. For example, a coordinate system is first established, with the first coordinate of the coordinate system being the independent variable, i.e., the position of the designated object in the target channel, for example, a parameter indicating the position of the first object, the second object, etc. The second coordinate of the coordinate system is a dependent variable, i.e., the focus tracking voltage of the designated object. Then, the coordinates of at least two designated objects on the coordinate system are acquired to give at least two coordinate points, and then a fitting relationship is obtained by fitting on the basis of the at least two coordinate points, where the fitting relationship may be a fitting curve, a fitting straight line, or a fitting surface. In some examples, the at least two coordinate points are fitted to give the fitting relationship between the position information of the designated object and the focus tracking voltage of the designated object, where the fitting relationship may be a fitting curve or a fitting straight line serving as the preset relationship. In some examples, any two adjacent coordinate points of the at least two coordinate points are fitted to give the fitting relationship between the position information of every two adjacent designated objects and the focus tracking voltage thereof, where the fitting relationships may each be a fitting curve or a fitting straight line, and the fitting curves or the fitting straight lines are spliced and/or smoothed to serve as the preset relationship. In some examples, the coordinate system further comprises a third coordinate, the third coordinate and the first coordinate together defining a position of the designated object in the target channel. Therefore, a plurality of coordinate points in a three-dimensional space may be fitted to give a fitting surface serving as the preset relationship, or the plurality of coordinate points may be fitted to give a plurality of fitting curves or fitting straight lines serving as the preset relationship. For example, the first coordinate, the second coordinate, and the third coordinate are X, Z, and Y axes, respectively, where the X axis and the Y axis are used to determine the position of the designated object and respectively denote the channel where the designated object is positioned and the position in the channel, while the Z axis denotes the focus tracking voltage of the designated object. In this example, the at least two coordinate points can be fitted once to give a preset relationship to improve the fitting efficiency; or any two adjacent coordinate points can be fitted, and then the preset relationship is acquired after splicing and/or smoothing to improve the fitting accuracy. In this example, after the preset relationship is acquired, the focus tracking voltages of the other objects may be acquired according to the respective positions in the target channel through the preset relationship.

In some examples, when the at least two designated objects are two designated objects, the two designated objects are respectively distributed in the two separated sub-regions at the two ends of the preset region of the chip. That is, the two designated objects are respectively distributed in the two separated sub-regions at the two ends of the preset region of the chip. In this example, since the focus tracking voltages of the other objects are acquired according to the focus tracking voltages of the two designated objects, when the two designated objects are respectively distributed in two separated sub-regions at the two ends of the preset region of the chip, the position height changes of the two designated objects can reflect the position height changes of the other objects between the two designated objects, such that the acquired focus tracking voltages of the other objects may be closer to the actual focus tracking voltages thereof. As such, the coordinate points of the two designated objects can be fitted into a fitting curve or a fitting straight line.

In some examples, when the at least two designated objects are three or more designated objects, there are at least three designated objects in the three or more designated objects respectively distributed in two separate sub-regions at two ends of the preset region of the chip and an intermediate sub-region that does not overlap with the two sub-regions. In this example, the addition of the intermediate sub-region that does not overlap with the two sub-regions allows the position height changes of the three designated objects to reflect not only the general height changes of other objects between the designated objects at the two ends of the preset region of the chip but also the local height changes of other objects between the intermediate designated object and the designated objects at the two ends. In other words, the uniform distribution of the three designated objects in the preset region of the chip allows the three designated objects to better reflect the general changes of the preset region of the chip relative to the horizontal plane, such that the acquired focus tracking voltages of the objects can be further closer to the actual focus tracking voltages. It will be appreciated that, when the number of the designated objects is greater and the distribution is more uniform, the general changes in the preset region of the chip relative to the horizontal plane can be better reflected, such that the acquired focus tracking voltages can be even closer to the actual focus tracking voltages. In this case, the coordinate points of the three or more designated objects may be fitted to give a fitting curve or a fitting straight line, or any two adjacent coordinate points of the three or more designated objects may be fitted to form a fitting curve or a fitting straight line.

When the controller 22 controls the imaging optical path assembly 18, the automatic focusing assembly 19 and the driving assembly 21 to focus on the samples of interest in the objects, the focus tracking voltages at the objects are determined on the basis of the preset relationship and the position information of the objects, and the automatic focus tracking is performed according to the focus tracking voltages of the objects, so as to acquire clear images at the objects.

In some examples, the imaging optical path assembly 18 comprises the objective lens 7 and the imaging detection component, wherein the imaging detection component is configured for imaging an object positioned in a preset region.

In some examples, the automatic focusing assembly 18 is configured for emitting the first light beam, receiving the first light beam reflected by the preset region for focusing detection, acquiring position information of the object, and outputting the target electric signal of the object when the imaging detection component acquires the clear image of the object.

In some examples, the driving assembly 21 is configured for driving the objective lens 7 and/or the preset region to move.

In some examples, the controller 22 is configured for controlling, according to the detected position information of the object of interest in the preset region by the automatic focusing assembly and the target electric signal of the object of interest, the driving assembly 21 to move the objective lens 7 and/or the preset region to a position where the objective lens 7 and/or the preset region can acquire the clear image of the object of interest, so as to acquire the clear image of the object of interest using the imaging detection component.

In some examples, the controller 22 determines target positions of the objective lens 7 where the imaging system can acquire the clear image of the object of interest according to the focus tracking voltage (target electric signal) of the object of interest output by the automatic focusing assembly 19. That is, the target electric signal and the target position of the objective lens 7 correspond to each other. The target position of the objective lens 7 can be acquired according to the target electric signal, and when the objective lens 7 is at the target position, the target electric signal can also be acquired. As such, whether the current position of the objective lens 7 is the target position of the objective lens is determined according to the target electric signal. If yes, an image of the object of interest is acquired using the imaging system so as to acquire the clear image of the object of interest. If no, the objective lens 7 is moved from the current position to the target position, and an image of the object of interest is acquired using the imaging system so as to acquire the clear image of the object of interest.

In some examples, when the controller 22 controls the driving assembly 21 to drive the objective lens 7 to return to the second image focusing position, the controller 22 can control the imaging detection component to perform image acquisition on the samples of interest in the objects, so as to achieve sequencing, and perform automatic focus tracking according to the focus tracking voltages of the objects. Specifically, in the process of image acquisition of an object, there may be various external factors that cause the target surface of the preset region of the chip to deviate from the focal plane of the objective lens 7. A difference is generated between the voltage generated by the photoelectric conversion of the focusing sensor 15 performed on the received first light beam reflected from the target surface and the focus tracking voltage. At this time, the controller 22 acquires the difference, and then controls the driving assembly 21 to drive the objective lens 7 to move according to the difference, so as to eliminate the difference by re-positioning the target surface of the preset region of the chip on the focal plane of the objective lens 7. This process is the automatic focus tracking process. However, when the image acquisition process proceeds from one object to another object in the same channel in the preset region of the chip, the variation in position height of the different objects due to the deformation in the preset region of the chip may lead to different focus tracking voltages of the two objects. At this time, a focus tracking voltage kept unchanged may not only fail the automatic focus tracking of the another object, but also blur the image acquired by the another object. As such, the controller 22 needs to re-acquire the focus tracking voltage of the another object according to the preset relationship and then perform automatic focus tracking according to the focus tracking voltage of the another object, thereby achieving the compensation for the focus tracking voltage to eliminate the influence caused by the deformation in the preset region of the chip, and ensuring that the automatic focus tracking can be continuously performed in the another object and the acquired images are continuously kept clear.

Figure 4:
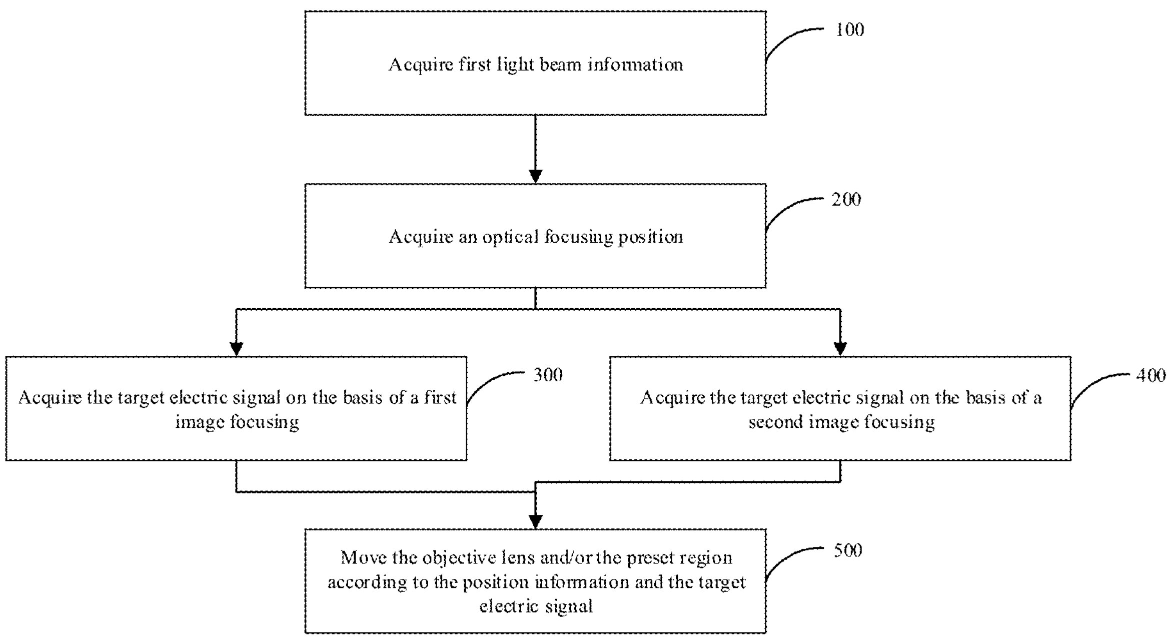
FIG. 4 is a flow chart of an imaging method according to one example.

Referring to FIG. 4, in some examples, an imaging method using the imaging system described above to image an object is provided, wherein the object is positioned in a preset region of a chip, the imaging system comprises an objective lens and an automatic focusing assembly connected to the objective lens by optical path coupling, and the automatic focusing assembly is configured for detecting position information of the object positioned in the preset region and outputting a target electric signal of the object when the imaging system acquires a clear image of the object. The imaging method comprises: moving, according to the detected position information of the object of interest in the preset region and the output target electric signal of the object of interest by the automatic focusing assembly, the objective lens and/or the preset region to a position where the clear image of the object of interest can be acquired, so as to acquire the clear image of the object of interest using the imaging system. By using the imaging method, automatic focus tracking can be achieved for different objects in the preset region according to the target electric signals of objects, and thus clear images can be acquired.

In some examples, moving, according to the detected position information of the object of interest in the preset region by the automatic focusing assembly and the target electric signal of the object of interest, the objective lens and/or the preset region to a position where the clear image of the object of interest can be acquired, comprises: determining, according to the target electric signal of the object of interest output by the automatic focusing assembly, target positions of the objective lens and/or the preset region where the imaging system can acquire the clear image of the object of interest, and determining whether a current position of the objective lens is the target position; if yes, acquiring an image of the object of interest using the imaging system so as to acquire the clear image of the object of interest; if no, moving the objective lens and/or the preset region from the current position to the target position, and acquiring an image of the object of interest using the imaging system so as to acquire the clear image of the object of interest.

In some examples, the object comprises a plurality of designated objects positioned at different positions in the preset region, and the target electric signal of the object of interest is acquired on the basis of a preset relationship between position information and target electric signals of at least two designated objects.

In some examples, the preset relationship is acquired by: fitting the position information of at least two designated objects and the target electric signal of each designated object to give a fitting relationship between the position information of the designated objects and the target electric signals of the designated objects, and taking the fitting relationship as the preset relationship.

In some examples, the fitting relationship comprises a fitting curve, a fitting straight line, or a fitting surface.

In some examples, fitting the position information of at least two designated objects and the target electric signal of each designated object, comprises: fitting every two adjacent designated objects and the target electric signals thereof to give a fitting relationship between every two adjacent designated objects and the target electric signals thereof, and taking such fitting relationships as the preset relationship.

In some examples, the fitting relationship comprises a fitting straight line or a fitting curve. In some examples, when the at least two designated objects are two designated objects, the two designated objects are respectively distributed in two separate sub-regions at two ends of the preset region.

In some examples, when the at least two designated objects are three or more designated objects, there are at least three designated objects in the three or more designated objects respectively distributed in two sub-regions at two ends of the preset region and an intermediate sub-region that does not overlap with the two sub-regions.

In some examples, the preset region comprises a plurality of axially movable surfaces, at least one of the plurality of axially movable surfaces is loaded with the object, and the surface loaded with the object is defined as a target surface for imaging.

In some examples, the automatic focusing assembly comprises a first light source and a focusing sensor; the first light source is configured for emitting a first light beam, and the focusing sensor is configured for receiving first light beam information reflected from the surfaces of the preset region;

the imaging system further comprises an imaging optical path assembly and a driving assembly;

the imaging optical path assembly comprises an objective lens and an imaging detection component, and the imaging detection component is configured for imaging a plurality of objects in the preset region;

the driving assembly is configured for driving the objective lens to move.

In some examples, the target electric signal of the object is acquired by:

step 100: acquiring first light beam information. The first light beam is emitted to the preset region using the first light source; the objective lens is driven to move towards the preset region along the optical axis thereof at a first step using the driving assembly, and after every move, a first position of the objective lens and the first light beam information reflected from the surfaces of the preset region and received by the focusing sensor are acquired;

step 200: acquiring an optical focusing position. On the basis of the first position and the first light beam information, an optical focusing position of the objective lens for the target surface is determined;

step 300: acquiring the target electric signal on the basis of a first image focusing. On the basis of the optical focusing position, the objective lens is driven to move along the optical axis thereof at a second step using the driving assembly, and after every move, a second position of the objective lens is acquired and the object on the target surface is imaged using the imaging detection component to give a first image, wherein the second position of the objective lens corresponding to the first image with the best image definition is used as a first image focusing position of the objective lens for the target surface; a voltage generated by the focusing sensor on the basis of the received first light beam reflected from the target surface when the objective lens is positioned at the first image focusing position is acquired as the target electric signal;

or, step 400: acquiring the target electric signal on the basis of a second image focusing. On the basis of the first image focusing position, the objective lens is driven to move along the optical axis thereof at a third step using the driving assembly, and after every move, a third position of the objective lens is acquired and the object on the target surface is imaged using the imaging detection component to give a second image, wherein the third position of the objective lens corresponding to the second image with the best image definition is used as a second image focusing position of the objective lens for the target surface; a voltage generated by the focusing sensor on the basis of the received first light beam reflected from the target surface when the objective lens is positioned at the second image focusing position is acquired as the target electric signal;

After acquiring the target electric signal, step 500 is further executed: moving the objective lens and/or the preset region according to the position information and the target electric signal. According to the detected position information of the object of interest in the preset region and the output target electric signal of the object of interest by the automatic focusing assembly, the objective lens and/or the preset region is moved to a position where the clear image of the object of interest can be acquired, so as to acquire the clear image of the object of interest using the imaging system.

In some examples, determining, on the basis of the first position and the first light beam information, an optical focusing position of the objective lens for the target surface, comprises: determining, on the basis of the first light beam information, whether at least one surface of the preset region is detected; if at least one surface of the preset region is detected, determining whether the target surface is detected in the at least one surface of the preset region; if the target surface is detected in at least one surface of the preset region, acquiring the first position of the objective lens when the target surface is detected, and taking the first position as the optical focusing position of the objective lens for the target surface.

In some examples, determining, on the basis of the first light beam information, whether at least one surface of the preset region is detected, comprises: acquiring, on the basis of the first light beam information, a relative distance between a focal plane of the objective lens and the surfaces of the preset region, and every time the relative distance between the focal plane of the objective lens and the surface of the preset region is zero, determining that one surface of the preset region is detected.

In some examples, if at least one surface of the preset region is detected, determining whether the target surface is detected in the at least one surface of the preset region, and if the target surface is detected in at least one surface of the preset region, acquiring the first position of the objective lens when the target surface is detected, and taking the first position as the optical focusing position of the objective lens for the target surface, comprise: acquiring, when two or more surfaces of the preset region are detected, the first positions of the objective lens when the surfaces are detected, respectively; acquiring, on the basis of distances between the first positions of the objective lens, distances between the surfaces; determining, on the basis of the distances between the surfaces, positions of the surfaces in the preset region; determining, on the basis of the positions of the surfaces in the preset region, the target surface; and taking the first position of the objective lens when the target surface is detected as the optical focusing position of the objective lens for the target surface.

In some examples, determining, on the basis of the first position and the first light beam information, an optical focusing position of the objective lens for the target surface, comprises: determining, on the basis of the first position and the first light beam information, whether at least one surface of the preset region is detected; if the at least one surface of the preset region is not detected, driving, on the basis of a current position of the objective lens, the objective lens to move along the optical axis thereof at a fifth step using the driving assembly, and after every move, acquiring a fourth position of the objective lens and imaging the object on the target using the imaging detection component to give a third image; determining again, on the basis of the image quality changes of the third images, whether at least one surface of the preset region is detected; if at least one surface of the preset region is detected, determining whether the target surface is detected in the at least one surface of the preset region; and if the target surface is detected in at least one surface of the preset region, acquiring the fourth position of the objective lens when the target surface is detected, and taking the fourth position as the optical focusing position of the objective lens for the target surface.

In some examples, determining, on the basis of the first light beam information, whether at least one surface of the preset region is detected, comprises: acquiring, on the basis of the first light beam information, a relative distance between a focal plane of the objective lens and the surfaces of the preset region, and every time the relative distance between the focal plane of the objective lens and the surface of the preset region is zero, determining that one surface of the preset region is detected.

In some examples, determining again, on the basis of the image quality changes of the third images, whether the surfaces of the preset region are detected, comprises: acquiring the third images sequentially according to a moving sequence of the objective lens; and every time the image quality of a third image is superior to those of two adjacent third images, determining that one surface of the preset region is detected when the third image is acquired.

In some examples, if at least one surface of the preset region is detected, determining whether the target surface is detected in the at least one surface of the preset region, and if the target surface is detected in at least one surface of the preset region, acquiring the fourth position of the objective lens when the target surface is detected, and taking the fourth position as the optical focusing position of the objective lens for the target surface, comprise: acquiring, when two or more surfaces of the preset region are detected, the fourth positions of the objective lens when the surfaces are detected, respectively; acquiring, on the basis of distances between the fourth positions of the objective lens, distances between the surfaces; determining, on the basis of the distances between the surfaces, positions of the surfaces in the preset region; determining, on the basis of the positions of the surfaces in the preset region, the target surface; and taking the fourth position of the objective lens when the target surface is detected as the optical focusing position of the objective lens for the target surface.

Some examples provide a computer-readable storage medium having a program stored thereon, the program being executable by a processor to implement the imaging method described above.

Those skilled in the art will appreciate that all or part of the functions of the methods in the above embodiments may be implemented by hardware, or may be implemented by a computer program. When all or part of the functions of the above embodiments are implemented by a computer program, the program may be stored on a computer-readable storage medium, and the storage medium may include: a read-only memory, a random access memory, a magnetic disk, an optical disk, a hard disk, etc. The program is executed by a computer to implement the above functions. For example, the program may be stored on a memory of a device, and when the program in the memory is executed by a processor, all or part of the functions described above can be implemented. In addition, when all or part of the functions in the above embodiments are implemented by a computer program, the program may be stored on a storage medium such as a server, another computer, a magnetic disk, an optical disk, a flash disk, or a portable hard disk, may be downloaded, copied or saved on a memory of a local device, or may update a system of the local device, and when the program on the memory is executed by a processor, all or part of the functions in the above embodiments may be implemented.

The present disclosure has been illustrated by means of specific examples, which, however, are provided to help understand the present disclosure, rather than limiting the present disclosure. Numerous simple deductions, modifications, or substitutions may also be made by those skilled in the art in light of the present teachings.

What is claimed is:

1. An imaging method using an imaging system to image an object, wherein the object is positioned in a preset region, the imaging system comprises an objective lens and an automatic focusing assembly coupled with the objective lens, and the automatic focusing assembly is configured for detecting position information of the object positioned in the preset region and outputting a target electric signal of the object when the imaging system acquires a clear image of the object; the imaging method comprises:

moving, according to the detected position information of the object of interest in the preset region and the output target electric signal of the object of interest by the automatic focusing assembly, the objective lens and/or the preset region to a position where the clear image of the object of interest can be acquired, so as to acquire the clear image of the object of interest using the imaging system, wherein the object comprises a plurality of designated objects positioned at different positions in the preset region, and the target electric signal of the object of interest is acquired on the basis of a preset relationship between position information and target electric signals of at least two designated objects.

2. The imaging method according to claim 1, wherein, moving, according to the detected position information of the object of interest in the preset region by the automatic focusing assembly and the target electric signal of the object of interest, the objective lens and/or the preset region to a position where the clear image of the object of interest can be acquired, comprises:

determining, according to the target electric signal of the object of interest output by the automatic focusing assembly, target positions of the objective lens and/or the preset region where the imaging system can acquire the clear image of the object of interest, and determining whether a current position of the objective lens is the target position;

if yes, acquiring an image of the object of interest using the imaging system so as to acquire the clear image of the object of interest;

if no, moving the objective lens and/or the preset region from the current position to the target position, and acquiring an image of the object of interest using the imaging system so as to acquire the clear image of the object of interest.

3. The imaging method according to claim 1, wherein the preset relationship is acquired by:

fitting the position information of at least two designated objects and the target electric signal of each designated object to give a fitting relationship between the position information of the designated objects and the target electric signals of the designated objects, and taking the fitting relationship as the preset relationship.

4. The imaging method according to claim 3, wherein, fitting the position information of at least two designated objects and the target electric signal of each designated object, comprises:

fitting every two adjacent designated objects and the target electric signals thereof to give a fitting relationship between every two adjacent designated objects and the target electric signals thereof, and taking the fitting relationship as the preset relationship.

5. The imaging method according to claim 1, wherein the preset region comprises a plurality of axially movable surfaces, at least one of the plurality of axially movable surfaces is loaded with a sample of interest, and the surface loaded with the sample of interest is defined as a target surface for imaging;

the automatic focusing assembly comprises a first light source and a focusing sensor; the first light source is configured for emitting a first light beam, and the focusing sensor is configured for receiving first light beam information reflected from the surfaces of the preset region;

the imaging system further comprises an imaging optical path assembly and a driving assembly;

the imaging optical path assembly comprises an imaging detection component, and the imaging detection component is configured for imaging a plurality of objects in the preset region;

the driving assembly is configured for driving the objective lens to move.

6. The imaging method according to claim 5, wherein the target electric signal of the object is acquired by:

emitting the first light beam to the preset region using the first light source;

driving the objective lens to move towards the preset region along the optical axis thereof at a first step using the driving assembly, and after every move, acquiring a first position of the objective lens and the first light beam information reflected from the surfaces of the preset region and received by the focusing sensor;

determining, on the basis of the first position and the first light beam information, an optical focusing position of the objective lens for the target surface;

driving, on the basis of the optical focusing position, the objective lens to move along the optical axis thereof at a second step using the driving assembly, and after every move, acquiring a second position of the objective lens and imaging the object on the target surface using the imaging detection component to give a first image, wherein the second position of the objective lens corresponding to the first image with the best image definition is used as a first image focusing position of the objective lens for the target surface;

acquiring a voltage generated by the focusing sensor on the basis of the received first light beam reflected from the target surface when the objective lens is positioned at the first image focusing position as the target electric signal;

or alternatively, driving, on the basis of the first image focusing position, the objective lens to move along the optical axis thereof at a third step using the driving assembly, and after every move, acquiring a third position of the objective lens and imaging the object on the target surface using the imaging detection component to give a second image, wherein the third position of the objective lens corresponding to the second image with the best image definition is used as a second image focusing position of the objective lens for the target surface; and acquiring a voltage generated by the focusing sensor on the basis of the received first light beam reflected from the target surface when the objective lens is positioned at the second image focusing position as the target electric signal.

7. The imaging method according to claim 6, wherein, determining, on the basis of the first position and the first light beam information, an optical focusing position of the objective lens for the target surface, comprises:

determining, on the basis of the first light beam information, whether at least one surface of the preset region is detected;

if at least one surface of the preset region is detected, determining whether the target surface is detected in the at least one surface of the preset region;

if the target surface is detected in at least one surface of the preset region, acquiring the first position of the objective lens when the target surface is detected, and taking the first position as the optical focusing position of the objective lens for the target surface.

8. The imaging method according to claim 6, wherein, determining, on the basis of the first position and the first light beam information, an optical focusing position of the objective lens for the target surface, comprises:

determining, on the basis of the first position and the first light beam information, whether at least one surface of the preset region is detected;

if the at least one surface of the preset region is not detected, driving, on the basis of a current position of the objective lens, the objective lens to move along the optical axis thereof at a fourth step using the driving assembly, and after every move, acquiring a fourth position of the objective lens and imaging the object in the preset region using the imaging detection component to give a third image;

determining again, on the basis of the image quality changes of the third images, whether at least one surface of the preset region is detected;

if at least one surface of the preset region is detected, determining whether the target surface is detected in the at least one surface of the preset region;

if the target surface is detected in at least one surface of the preset region, acquiring the fourth position of the objective lens when the target surface is detected, and taking the fourth position as the optical focusing position of the objective lens for the target surface.

9. An imaging system, comprising:

an imaging optical path assembly, comprising an objective lens and an imaging detection component, wherein the imaging detection component is configured for imaging an object positioned in a preset region;

an automatic focusing assembly, configured for emitting a first light beam to the preset region, receiving the first light beam reflected from the preset region for focusing detection, acquiring position information of the object, and outputting a target electric signal of the object when the imaging detection component acquires a clear image of the object;

a driving assembly, configured for driving the objective lens and/or the preset region to move; and a controller, configured for:

controlling, according to the detected position information of the object of interest in the preset region by the automatic focusing assembly and the target electric signal of the object of interest, the driving assembly to move the objective lens and/or the preset region to a position where the clear image of the object of interest can be acquired, so as to acquire the clear image of the object of interest using the imaging detection component, wherein the object comprises a plurality of designated objects positioned at different positions in the preset region, and the target electric signal of the object of interest is acquired on the basis of a preset relationship between position information and target electric signals of at least two designated objects.

10. The imaging system according to claim 9, wherein, controlling, according to the detected position information of the object of interest in the preset region by the automatic focusing assembly and the target electric signal of the object of interest, the driving assembly to move the objective lens and/or the preset region to a position where the clear image of the object of interest can be acquired, comprises:

determining, according to the target electric signal of the object of interest output by the automatic focusing assembly, target positions of the objective lens and/or the preset region where the imaging detection component can acquire the clear image of the object of interest, and determining whether a current position of the objective lens is the target position;

if yes, acquiring an image of the object of interest using the imaging detection component so as to acquire the clear image of the object of interest, if no, controlling the driving assembly to move the lens and/or the preset region from the current position to the target position, and acquiring an image of the object of interest using the imaging detection component so as to acquire the clear image of the object of interest.

11. The imaging system according to claim 9, wherein the preset relationship is acquired by:

fitting the position information of at least two designated objects and the target electric signal of each designated object to give a fitting relationship between the position information of the designated objects and the target electric signals of the designated objects, and taking the fitting relationship as the preset relationship.

12. The imaging system according to claim 11, wherein, fitting the position information of at least two designated objects and the target electric signal at each designated object, comprises:

fitting every two adjacent designated objects and the target electric signals thereof to give a fitting relationship between every two adjacent designated objects and the target electric signals thereof, and taking the fitting relationship as the preset relationship.

13. The imaging system according to claim 9, wherein the clear image of the object of interest is acquired by:

determining, on the basis of the preset relationship and position information of the object of interest, the target electric signal of the object of interest;

controlling the objective lens and the preset region to move relatively according to the target electric signal to give the clear image of the object of interest.

14. The imaging system according to claim 13, wherein the preset region comprises a plurality of axially movable surfaces, at least one of the plurality of axially movable surfaces is loaded with a sample of interest, and the surface loaded with the sample of interest is defined as a target surface for imaging;

the target electric signal of the object is acquired by:

emitting the first light beam to the preset region using the first light source;

driving the objective lens to move towards the preset region along the optical axis thereof at a first step using the driving assembly, and after every move, acquiring a first position of the objective lens and the first light beam information reflected from the surfaces of the preset region and received by the focusing sensor;

determining, on the basis of the first position and the first light beam information, an optical focusing position of the objective lens for the target surface;

driving, on the basis of the optical focusing position, the objective lens to move along the optical axis thereof at a second step using the driving assembly, and after every move, acquiring a second position of the objective lens and imaging the object on the target surface using the imaging detection component to give a first image, wherein the second position of the objective lens corresponding to the first image with the best image definition is used as a first image focusing position of the objective lens for the target surface;

acquiring a voltage generated by the focusing sensor on the basis of the received first light beam reflected from the target surface when the objective lens is positioned at the first image focusing position as the target electric signal; or alternatively, driving, on the basis of the first image focusing position, the objective lens to move along the optical axis thereof at a third step using the driving assembly, and after every move, acquiring a third position of the objective lens and imaging the object on the target surface using the imaging detection component to give a second image, wherein the third position of the objective lens corresponding to the second image with the best image definition is used as a second image focusing position of the objective lens for the target surface; and acquiring a voltage generated by the focusing sensor on the basis of the received first light beam reflected from the target surface when the objective lens is positioned at the second image focusing position as the target electric signal.

15. The imaging system according to claim 14, wherein, determining, on the basis of the first position and the first light beam information, an optical focusing position of the objective lens for the target surface, comprises:

determining, on the basis of the first light beam information, whether at least one surface of the preset region is detected;

if at least one surface of the preset region is detected, determining whether the target surface is detected in the at least one surface of the preset region;

if the target surface is detected in at least one surface of the preset region, acquiring the first position of the objective lens when the target surface is detected, and taking the first position as the optical focusing position of the objective lens for the target surface.

16. The imaging system according to claim 14, wherein, determining, on the basis of the first position and the first light beam information, an optical focusing position of the objective lens for the target surface, comprises:

determining, on the basis of the first position and the first light beam information, whether at least one surface of the preset region is detected;

if the at least one surface of the preset region is not detected, driving, on the basis of a current position of the objective lens, the objective lens to move along the optical axis thereof at a fourth step using the driving assembly, and after every move, acquiring a fourth position of the objective lens and imaging the object in the preset region using the imaging detection component to give a third image;

determining again, on the basis of the image quality changes of the third images, whether at least one surface of the preset region is detected;

if at least one surface of the preset region is detected, determining whether the target surface is detected in the at least one surface of the preset region;

if the target surface is detected in at least one surface of the preset region, acquiring the fourth position of the objective lens when the target surface is detected, and taking the fourth position as the optical focusing position of the objective lens for the target surface.

17. A non-transitory computer-readable storage medium, wherein the medium has a program stored thereon, and the program is executable by a processor to implement the method of claim 1.

* * * * *